(12) United States Patent
Powell

(10) Patent No.: US 12,118,635 B1
(45) Date of Patent: Oct. 15, 2024

(54) APPARATUS AND METHOD FOR GENERATING A COACHING DEVELOPMENT WITHIN A COACHING PROCESS

(71) Applicant: TES FRANCHISING, L.L.C., Southbury, CT (US)

(72) Inventor: Terry Powell, Southbury, CT (US)

(73) Assignee: TES FRANCHISING, L.L.C., Southbury, CT (US)

(*) Notice: Subject to any disclaimer, the term of this patent is extended or adjusted under 35 U.S.C. 154(b) by 0 days.

(21) Appl. No.: 18/588,130

(22) Filed: Feb. 27, 2024

(51) Int. Cl.
| | |
|---|---|
| *G06Q 10/00* | (2023.01) |
| *G06N 3/0464* | (2023.01) |
| *G06Q 50/20* | (2012.01) |
| *G06F 40/20* | (2020.01) |
| *G06V 30/10* | (2022.01) |

(52) U.S. Cl.
CPC ....... *G06Q 50/2057* (2013.01); *G06N 3/0464* (2023.01); *G06F 40/20* (2020.01); *G06V 30/10* (2022.01)

(58) Field of Classification Search
CPC .. G06Q 50/2057; G06N 3/0464; G06F 40/20; G06V 30/10
See application file for complete search history.

(56) References Cited

U.S. PATENT DOCUMENTS

| | | | |
|---|---|---|---|
| 7,156,665 B1 | 1/2007 | O'Connor | |
| 8,628,331 B1 | 1/2014 | Wright | |
| 10,186,167 B2 | 1/2019 | Segal | |
| 2005/0228691 A1 | 10/2005 | Paparo | |
| 2015/0242979 A1* | 8/2015 | Abts | G06Q 50/2057 705/328 |
| 2015/0248641 A1* | 9/2015 | Bastide | G06Q 10/10 705/328 |
| 2020/0098073 A1* | 3/2020 | Le, Jr. | G09B 5/14 |
| 2022/0277271 A1* | 9/2022 | Varma | G06Q 10/06311 |
| 2023/0230011 A1* | 7/2023 | Srinivasa | G06F 16/90335 705/322 |

FOREIGN PATENT DOCUMENTS

| | | | | |
|---|---|---|---|---|
| KR | 10-2021-0042234 A | 4/2021 | | |
| WO | WO-2020056444 A1 * | 3/2020 | ......... | G06F 16/9535 |

* cited by examiner

*Primary Examiner* — Gabrielle A McCormick
(74) *Attorney, Agent, or Firm* — Caldwell Intellectual Property Law

(57) ABSTRACT

An apparatus for generating a personalized development program, the apparatus comprises a data collection unit configured to collect user data and a computing device connected to the data collection unit configured to receive user data, process the user metadata using an objective classifier, wherein the objective classifier is configured to transform user metadata into user objective datums, obtain user data associated with user objective datums containing historical progress data, generate a coaching development program using a development program machine-learning model, wherein the development program machine-learning model is configured to determine a plurality of resources and strategies for goals achievement as a function of user objective datums and the historical progress data, maintain a user progress tracking and adapt development path within the personalized development program by executing modifications on the program based on secondary user input data, and display the coaching development program using a visual interface.

20 Claims, 7 Drawing Sheets

APPARATUS AND METHOD FOR GENERATING A COACHING DEVELOPMENT WITHIN A COACHING PROCESS

FIELD OF THE INVENTION

The present invention generally relates to the field of machine learning and data analytics. In particular, the present invention is directed to an apparatus for generating a coaching development program within a coaching process.

BACKGROUND

Traditionally, personal coaching, particularly in a professional context, has been a manual process, with coaches working one-on-one with individuals to set goals, develop plans, and track progress. However, these traditional methods can be time-consuming, costly, and may not be personalized to the full extent possible for each individual.

SUMMARY OF THE DISCLOSURE

In an aspect an apparatus for generating a coaching development program within a coaching process includes a computing device configured to receive user data pertaining to a user, wherein the user data comprises user metadata. The apparatus processes the user metadata, wherein processing the user metadata comprises generating an objective classifier using user objective training data, wherein the user objective training data comprises a plurality of user metadata as input correlate to a plurality of user objective datums as output and classifying the user metadata into at least one user objective datum using the trained objective classifier, wherein the at least one user objective datum comprises at least one primary user objective datum. The apparatus further generating a coaching development program as a function of the processed user metadata, wherein the coaching development program comprises at least one program objective datum and the coaching development program is configured to provide a user access to a plurality of resources using a coaching enhancement module, wherein the plurality of resources comprises at least a training session. The apparatus further initiating a digital communication based on the coaching development program between the user and a first entity, wherein the digital communication comprises at least a linkage between the first entity and a second entity.

In another aspect, a method for generating a coaching development program within a coaching process includes receiving, by at least a processor, user data pertaining to a user, wherein user data comprises user metadata. The method includes processing, by the at least a processor, a user metadata, wherein processing the user metadata comprises generating an objective classifier using user objective training data, wherein the user objective training data comprises a plurality of user metadata as input correlate to a plurality of user objective datums as output, and classifying the user metadata into at least one user objective datum using the trained objective classifier, wherein the at least one user objective datum comprises at least one primary user objective datum. The method includes generating, by the at least a processor, a coaching development program as a function of the processed user metadata, wherein the coaching development program comprises at least one program objective datum, and the coaching development program is configured to provide a user access to a plurality of resources using a coaching enhancement module, wherein the plurality of resources comprises at least a training session. The method further includes initiating, by the at least a processor, a digital communication based on the coaching development program between the user and a first entity, wherein the digital communication comprises at least a linkage between the first entity and a second entity.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a coaching development program.

Aspects of the present disclosure can be used to facilitate efficient and personalized development programs for users seeking coaching in their professional fields. Aspects of the present disclosure can also be used to enhance the matching process between coaches and users based on comprehensive data analysis and machine learning models. This is so, at least in part, because the disclosed system and method provide a tailored approach to personal development, taking into account the user's unique skills, professional background, and personal goals, as well as tracking their progress and adapting the coaching program over time.

Aspects of the present disclosure allow for a dynamic and adaptive coaching process, that enhances the user's learning experience and enables them to reach their goals more effectively the disclosed system, by incorporating machine learning models and natural language processing, creates a highly personalized development path and superior matching system for coaches and users. Exemplary embodiments illustrating aspects of the present disclosure are described below in the context of several specific examples.

Figure 1:
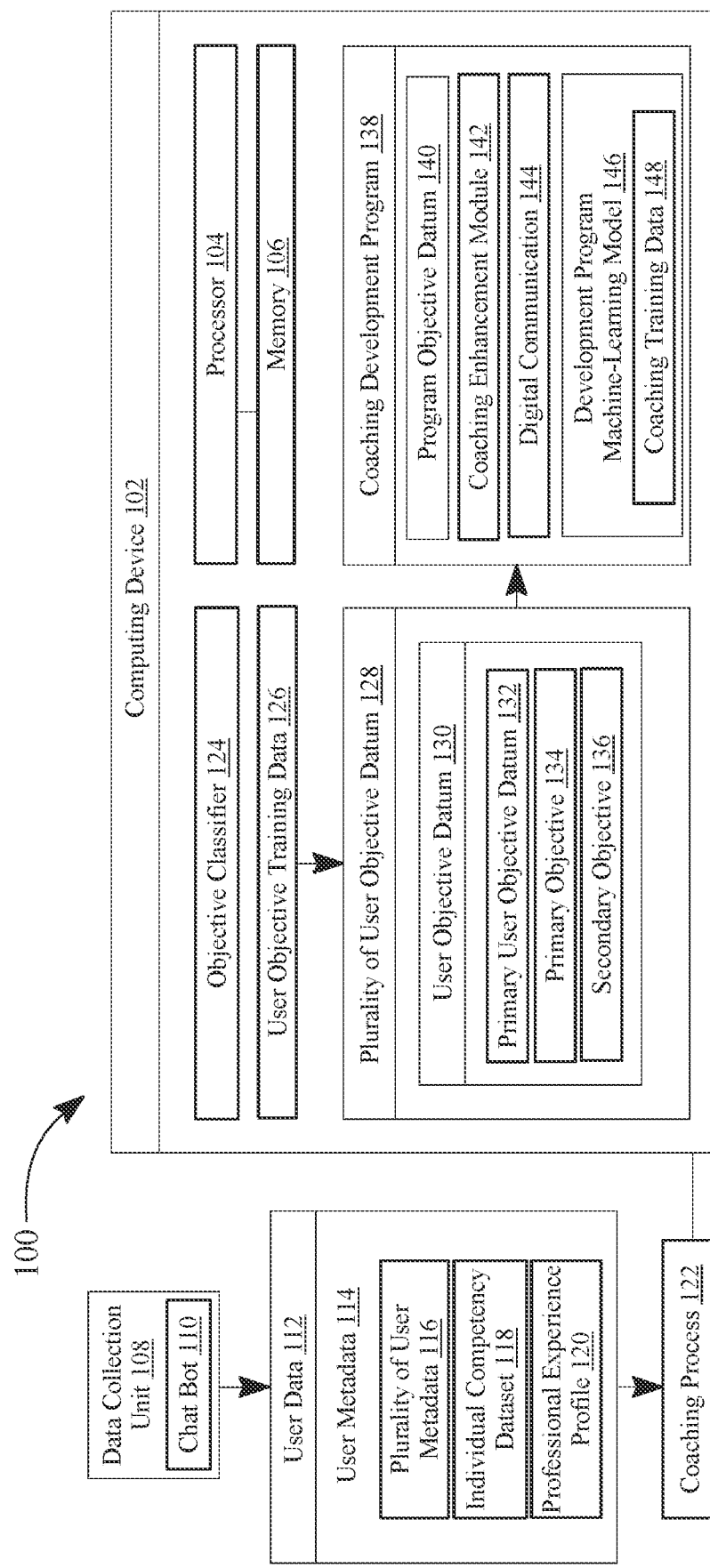
FIG. 1 is a block diagram of an exemplary system for an apparatus for generating a coaching development program within a coaching process.

Referring now to FIG. 1, an exemplary embodiment of an apparatus for generating a personal achievement within a coaching process 122 is illustrated. The apparatus includes a processor. Processor may include, without limitation, any processor described in this disclosure. Processor 104 may be included in a computing device. Computing device 102 may include any computing device as described in this disclosure, including without limitation a microcontroller, microprocessor, digital signal processor (DSP) and/or system on a chip (SoC) as described in this disclosure. Computing device 102 may include, be included in, and/or communicate with a mobile device such as a mobile telephone or smartphone. Computing device 102 may include a single computing device operating independently, or may include two or more computing device operating in concert, in parallel, sequentially or the like; two or more computing devices may be included together in a single computing device or in two or more computing devices. Computing device 102 may interface or communicate with one or more additional devices as described below in further detail via a network interface device. Network interface device may be utilized for connecting computing device 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 102 may include but is not limited to, for example, a computing device or cluster of computing devices in a first location and a second computing device or cluster of computing devices in a second location. Computing device 102 may include one or more computing devices dedicated to data storage, security, distribution of traffic for load balancing, and the like. Computing device 102 may distribute one or more computing tasks as described below across a plurality of computing devices of computing device, which may operate in parallel, in series, redundantly, or in any other manner used for distribution of tasks or memory between computing devices. Computing device 102 may be implemented, as a non-limiting example, using a "shared nothing" architecture.

With continued reference to FIG. 1, computing device 102 may be designed and/or configured to perform any method, method step, or sequence of method steps in any embodiment described in this disclosure, in any order and with any degree of repetition. For instance, computing device 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may include a memory 106. Memory 106 may contain instructions configuring processor 104 to perform actions consistent with this disclosure. Memory 106 is communicatively connected to processor 104. As used in this disclosure, "communicatively connected" means connected by way of a connection, attachment or linkage between two or more relata which allows for reception and/or transmittance information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, apparatus 100 may include at least a data collection unit 108. For the purposes of this disclosure, a "data collection unit" is a hardware device, software component, or otherwise an integrated system designed to systematically gather, measure, and/or record data from one or more data sources. In some embodiments, the data collection unit 108 may be a data logger, wherein the data logger may be configured to collect and/or records data over time. In other embodiments, the data collection unit 108 may be a software module or application operating within a larger system. For example, it may be a web scraping tool within a larger data analysis software suite, tasked with extracting data from online sources. For example, data collection unit 108 in a personal development and coaching system may be a smart application on a user's mobile device. Data collection unit 108 may collect and record a range of user data 112 throughout the coaching process 122. For example, data collection unit 108 may track the user's time spent on skill-building activities, engagement with online courses, responses to coaching feedback, and self-reported mood and stress levels. It may track physical data like sleep patterns and exercise, if relevant to the user's goals. For the purpose of this disclosure, "user data" refers to information related to a user. In this context, a user specifically refers to an individual or a group of individuals who have signed up for training, seeking to be trained and developed into coaches or mentors. This could encompass, without limitation, individual trainees, prospective coaches, mentor candidates, and others interested in pursuing a coaching or mentoring role. In an embodiment, user data may include user input data. As a non-limiting example, this may be in the form of responses to prompts or questionnaires provided by apparatus 100. In this disclosure, "input data" refers to the data explicitly provided by the user. In an embodiment, user data may include information on the user's personal skills (e.g., communication skills, leadership, problem-solving, and the like), professional background (e.g., job roles, skills and knowledge, experience, and the like), stated preferences (e.g., preferred learning style, mode of communication, preferred coaching style, and the like). In some embodiments, user data 112 may include one or more short-term and long-terms objectives, and any user interaction data accumulated from previous coaching sessions. For the purpose of this disclosure, "objective" refers to a specific, measurable, and time-bound goal that a user aims to achieve. The two primary categories of objectives, in terms of time duration, are short-term objectives and long-term objectives. Short-term objectives, also known as "primary objective," are goals that a user intends to achieve in the near future, within a few weeks or months. These objectives are simpler, more tactical, and are steps towards achieving a large, long-term objective. For example, completing an online course in a specific subject matter, meeting a weight loss goal for the month, or reading a set number of books within a predetermined time frame. Long-term objectives, also known as "secondary objectives," are goals that a user aim to achieve over an extended period, over a few years or more. These goals are more complex and strategic, requiring consistent effort and progress over time. For example, long-term objective may include earning a professional degree or certification, achieving a significant career milestone, or mastering a complex skill set. For the purpose of this disclosure, "user interaction data" refers to the data collected during the interaction between the user and a chatbot or another interactive element of the apparatus 100. This data may include the user's responses, choices, feedback, queries, as well as the time, frequency, and pattern of interaction. User Interaction data may provide valuable insights into the user's preferences, behavior, engagement level, and progress towards their objectives, and tailor the coaching development program to the user's specific needs. For the purpose of this disclosure, "coaching sessions" refers to structured periods of time during a user interacts with a coach or a coaching system. In some embodiment, sessions are designed to guide, instruct, or assist the user in achieving their objectives. Sessions may include various activities including, but not limited to, discussing goals, reviewing progress, providing advice, setting action plans, addressing challenges, and learning new skills or strategies. Coaching sessions may take various forms depending on the context and the objectives of the user. For instance, it may be one-on-one sessions with a human coach, group sessions, online classes, interactive tutorials, or even AI-guided self-learning sessions. This extensive set of user data provides a multi-faceted profile of the user, enabling tailored and personalized development program.

With continued reference to FIG. 1, in some embodiments, receiving user data 112 may include accepting a smart assessment from the user. As used in this disclosure, a "smart assessment" is a set of questions that asks for a user's information, wherein each question contains answers that influence user plans, objectives, and/or any processing step described in this disclosure. In some cases, smart assessment may be in a form such as, without limitation, survey, transactional tracking, interview, report, events monitoring, and the like thereof. In some embodiments, smart assessment may include a data submission of one or more documentations from the user. As used in this disclosure, a "data submission" is an assemblage of data provided by the user as an input source. In a non-limiting example, data submission may include user uploading one or more data collections to processor 104. As used in this disclosure, a "documentation" is a source of information. In some cases, documentation may include electronic documents, such as, without limitation, txt file, JSON file, word document, pdf file, excel sheet, image, video, audio, and the like thereof. In a non-limiting example, documentation may include one or more documents containing user feedback and/or user response after coaching session and may be input source of data submission for further processing. Further processing may include any processing step described below in this disclosure. Additionally, or alternatively, documentation may include one or more answers of smart assessment.

With continued reference to FIG. 1, in some embodiments, questions within smart assessment may be selected from a pre-defined set of questions, wherein the pre-defined set of questions are questions user specified prior to accepting smart assessment. In some cases, the user may be a system administrator. In a non-limiting example, questions of smart assessment may be selected from a question bank, wherein the question bank may include a plurality of example questions. Additionally, or alternatively, processor 104 may be configured to generate smart assessment and/or questions within smart assessment. In some embodiments, smart assessment may include a base question. Base question may be a question from pre-defined set of questions described above. Processor 104 may be configured to generate questions within smart assessment based on the answer to base question.

Still referring to FIG. 1, in some embodiments, receiving user data 112 may include extracting user data from user input e.g., any data submission described herein such as documentations using optical character recognition. Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwrite recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3-4.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, data collection unit 108 may be configured to receive user data 112 and/or any data described herein from a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in one or more embodiments, data collection unit 108 may include at least a chat bot 110. In some embodiments, chat bot 110 is communicatively connected to data collection unit 108. For the purposes of this disclosure, a "chat bot" is a software application or a computer program designed to stimulate human conversation or interaction. In an embodiment, user data 112 may include focus data. "Focus data," as described in this disclosure, refers to the collection of distinct, user-provided information that is pertinent to the coaching process. In some embodiments, focus data may include, without limitation, user's skill set data, professional background data, primary objective datum, and secondary objective datum. These data points serve as a foundation for the construction and adjustment of the user's personalized development program; for instance, and without limitation, machine-learning module (as described in further detail below) may take these data points as part of the input parameters. The user's existing skills and professional background data function as initial inputs that assist the algorithm in selecting suitable learning resources may from a curated database and establishing learning objectives based on pattern recognition and comparative analysis. Concurrently, the user's immediate and secondary objectives are processed by the algorithm to guide the learning trajectory, helping prioritize learning modules, and shaping the long-term progress path within the software program. By consistently updating these data points based on user interactions and feedback. As a non-limiting example, chat bot 110 may guide the user through a personalized assessment, assisting in the identification and articulation of both immediate and long-term goals.

With continued reference to FIG. 1, generating the coaching development program comprises integrating a scheduling system configured to reschedule a coaching session based on the processed metadata. "Scheduling system," as described in this disclosure, may be a software integrated within the chatbot application that enables user to manage their interactions with their coach by scheduling, rescheduling, or cancelling appointments. The scheduling system may automatically synchronize with the user's calendar application, as well as with the coach's availability, to find suitable time slot for coaching session. For example, after the scheduling system retrieve the user's and the coach's calendar data, when given permission, it may identify potential time slot where both parties are available. Upon identifying a suitable time slot, the system may present he option to the user to book a session. If user agrees, system may then automatically mark this time slot as booked in both the user's and the coach's calendar. Another example, the scheduling system may utilize an intelligent notification system. This notification system may remind users of their upcoming sessions, and even alert them if a session is nearing and they have not yet prepared or are not in the appropriate location for the session. The notification system may use a variety of communication methods including but not limited to, in-app notifications, SMS, email, or push notifications. Also, the scheduling system may be designed to support a variety of communication preferences. For example, if a user prefers text-based communication, chatbot may handle most of the interaction. Alternatively, the scheduling system may offer a smooth transition to video calls or other communication platforms when a coaching session is scheduled, effectively accommodating a wide range of user communication preferences.

With continued reference to FIG. 1, data collection unit 108 is configured to receive and collect a user date 112, wherein receiving user data 112 comprises a data automation. For example, and without limitation, data may represent user-provided information, system logs, user interaction metrics, or computational outputs. In one or more embodiments, user data 112 includes but is not limited to user's skill set data, professional background data, primary objective datum, and secondary objective datum. User data 112 may transmit or receive signals to or from computing device 102. Signals may include electrical, electromagnetic, optical, audio, radio waves, or another undisclosed signal type alone or in combination. In this disclosure, "data automation" refers to automated processes that manage, capture, and interpret existing data, typically carried out by software or digital tools. As a non-limiting example, data automation may involve mechanisms such as web crawling, natural language processing, application programming interfaces (APIs) utilization, or machine learning techniques to gather, analyze, and categorize the user data 112 efficiently and without the need for constant human supervision. This helps in streamlining the data collection process, enhancing accuracy, and enabling real-time processing and updating of user data.

Still referring to FIG. 1, in some embodiments, data automation may include one or more usage of a web crawler or storage of user data 112 obtained using the web crawler. A web crawler may be configured to automatically search and collect information related to a user. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape entity data from entity related social media and networking platforms. The web crawler may be trained with information received from an entity through a digital interface. As a non-limiting example, an entity employee may input into a digital interface, social media platforms the entity has accounts on and would like to retrieve entity data from. A digital interface may include a graphical user interface (GUI), command line interface (CLI), menu-driven user interface, touch user interface, voice user interface (VUI), form-based user interface, and the like. Processor may receive entity data including information such as an entity's name, profile, platform handles, platforms associated with the entity, descriptions of activities undertaken by entity, descriptions of products or services offered by entity, descriptions of achievements of entity employees, profiles of entity employees, business partners associated with entity, and the like. In some embodiments, a web crawler may be configured to generate a web query. A web query may include search criteria. Search criteria may include entity account handles, employee account handles, web page addresses and the like received from the entity. A web crawler function may be configured to search for and/or detect one or more data patterns. A "data pattern" as used in this disclosure is any repeating forms of information. A data pattern may include, but is not limited to, features, phrases, and the like as described further below in this disclosure. The web crawler may work in tandem with a machine-learning model, digital processing technique utilized by a processor, and the like as described in this disclosure. In some embodiments, a web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for data related to entity employees. In some embodiments, computing device 102 may determine a relevancy score of entity data retrieved by a web crawler.

Still referring to FIG. 1, user data 112 include a user metadata 114. User metadata 114 includes a plurality of user metadata 118. As used in this disclosure, "plurality of user metadata" refers to a broad spectrum of information related to a user's attributes, competencies, and prior experiences. In some embodiments, user metadata 114 may include an individual competency dataset and a professional experience profile 120. As used in this disclosure, an "individual competency dataset" is a collection of structured data that may capture and quantify the individual's skill, knowledge, abilities, behaviors, or other attributes relevant to personal or professional development. In some cases, individual competency dataset 118 may include, without limitation, personal skills (i.e., user's abilities and capabilities, often developed through personals experiences, hobbies, and other non-professional activities), professional competencies (i.e., user's abilities and expertise directly associated with their professional arena or industry), and the like; for instance, and without limitation, individual competency dataset 118 may include one or more data elements such as, "problem-solving," "critical thinking," "adaptability," "creativity," "communication, leadership," "time management," among others. In another non-limiting example, individual competency dataset 118 may include data describing user's domain-specific knowledge, technical skills, proficiency in handling particular tools or technologies, or skills in project management. Additionally, or alternatively, individual competency dataset 118 may also include one or more data elements describing user's past experiences reflecting a chronicle of the user's previous roles, projects, achievements, and any other pertinent experiences. For example, and without limitation, such data elements may offer insights into the user's practical abilities and their performance history in a professional context. Further, individual competency dataset 118 may include one or more data elements describing educational background gathered from the user (e.g., academic degrees darned, institutions attended, courses completed, grades received, honors awarded, certifications obtained, and any continuing education or professional development coursework). By leveraging this diverse array of metadata, the disclosed system may formulate a detailed and nuanced profile of the user, thereby enabling it to customize a coaching development program that caters exclusively to their requirements and goals.

With continued reference to FIG. 1, user data 112 include a user metadata 114, user metadata 114 includes a professional experience profile 120. In some cases, user metadata 114 may include a timestamp when apparatus 100 receives the user data. In some cases, user metadata may include a user preference, wherein the user preference is configured to help apparatus 100 to provide personalized recommendations and strategies that resonate with the user's interest, learning style, and comfort level. In other cases, user metadata may include user device information. In an embodiment, apparatus 100 may include a user device. As used in this disclosure, a "user device" is a device used by an individual (i.e., a user) to access, interact with, or perform processing tasks. In some cases, user data 112 may be collected via user device. In a non-limiting example, user devices may include, without limitation, desktop computers, laptops, tables, smartphones, any other mobile devices, and the like. User data collected via user device may include metadata such as, without limitation, information related to device type, operating system, and software version of user device. As used in this disclosure, "professional experience profile" refers to a record of a user's professional background and professional journey. In some embodiments, professional experience profile 120 may include, without limitation, professional history (i.e., record for employment and work experience), achievements and accomplishments (i.e., successful projects completed, awards won, recognition received, and specific results achieved), skillsets (i.e., technical abilities, communication, leadership, or team-building skills), areas of expertise, professional goals, and the like; for instance, and without limitation, the total number of years spent in the professional field, the professional experience profile may encapsulate job-specific technical skills. These may be specific software proficiencies, mastery of certain equipment, or knowledge of proprietary systems relevant to the job role. In roles requiring organizational and leadership prowess, profile may include evidence of project management skills (i.e., experience managing projects, teams, budgets, and timelines). Advanced degrees or credentials held by the user may also feature, highlight specialized knowledge or skills. For example, and without limitation, research or inventive fields, the presence of peer-reviewed papers or patents may provide proof of expertise and contribution to the professional field. In incorporating these detailed elements into professional experience profile 120, apparatus 100 may gain a comprehensive understanding of the user's career trajectory, expertise, and professional competencies. This enables the creation of a highly personalized and targeted development program, tailor-made for the user's professional needs and aspirations. In one or more embodiments, professional experience profile 120 may include user's professional roles and tenures information. As used in this disclosure, "professional roles and tenures" refers to the various job positions that the user has held, the duration of each role, and the organizations where these roles were performed. The user's domain expertise is often an aggregate of their knowledge and skills that pertain to a specific industry or job function. This may include understanding of industry trends, regulatory environments, specialized technical skills, and any other relevant competencies.

In some embodiments, professional experience profile 120 may include user's accomplishments and achievements information. "Accomplishments", as used in this disclosure, refers to the reflection on the user's major accomplishments, awards, recognitions, or any significant milestones achieved in their professional journey. These may be instrumental in assessing the user's proficiency and success in their field.

In some embodiments, professional experience profile 120 may user's training and certification information. This portion outlines any additional training, certifications, or qualifications that the user has received. Such certifications may often supplement a user's formal education, offering more credibility and demonstrating commitment to continuous learning.

In some embodiments, professional experience profile 120 may include user's skills and proficiencies. "Proficiencies", as used in this disclosure, refers to the range of skills that the user possesses, which may include both technical and non-technical competencies. Skills may range from proficiency in specific software, familiarity with certain methodologies, to soft skills such as but not limited to team management or leadership.

Continuing to reference FIG. 1, processor 104 may use a machine learning module, to implement one or more algorithms or generate one or more machine-learning models such as development program machine-learning model 146. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. User objective training data 126 may be used to generate development program machine-learning model 146 and/or any other machine learning model, such as user designation machine learning model described below, using training data. Development program machine-learning model 142 may be trained by correlated inputs and outputs of training data. Training data may be data sets that have already been converted from raw data whether manually, by machine, or any other method. Training data may include previous outputs such that development program machine-learning model 146 iteratively produces outputs. Development program machine-learning model 146 using a machine-learning process may output converted data based on input of training data. In an embodiment, analyzing the user profile comprising the plurality of user related data may include determining a user objective based on the user profile and the plurality of user related data using a machine learning model, such as development program machine-learning model 146 generated by user objective datum 132. Development program machine-learning model 146 may be trained by training data, discussed in further detail below, such as user objective training data. User objective training data may be stored in database.

With continued reference to FIG. 1, apparatus 100 may process the user metadata 114 of the user. Processing user metadata 114 includes generating an objective classifier 124 using user objective training data 126. In an embodiment, objective classifier 124 may be generated using machine learning module as described above. This objective classifier 124 is constructed using a unique data set referred to as a user objective training data 126. User objective training data 126 comprises a plurality of user metadata 116, serving as its inputs. These inputs, in turn, correlate to a plurality of a user objective datums 130, function as the outputs. As described in this disclosure, a "unique data set," refers to the user objective training data 126, pertains to a compilation of individual data points, each data point being a set of user metadata 114. This unique data set encapsulates a wide range of information regarding the user's skills, educational background, professional experience, and other relevant attributes. This may include, but not be limited to, a user's specific technical abilities, areas of expertise, prior roles and responsibilities, industries of experience, academic qualifications, and other soft skills. Each data point within this unique data set may provide a multidimensional perspective on the user's professional trajectory, and this information becomes critical when training objective classifier 124. The classifier uses these inputs to discern patterns, trends, and correlations that are central to defining and refining the user's primary objectives, as reflected in the user objective datums 130. As described in this disclosure, a "primary objective" refers to a user's central goal, often forming the focus of their coaching development program. This may be fundamental to the user's career path or personal growth. It may include, but is not limited to, career-related objectives such as achieving a specific role or position, mastering a particular skill set, expanding professional networks, or transitioning into a new industry. For a learner or student, this may involve academic targets such as completing a certain course or degree, acquiring knowledge in a specific subject, or preparing for a certain examination. As described in this disclosure, "user objective datum" refers to specific data that derived from user data, output of measurable indicator that may represent or correlate to the goal, ambitions, or objectives of a user. In the context of personal development, it may mean improving health and wellness, developing leadership skills, or enhancing interpersonal relationships. The primary objective forms the basis for tailored coaching, learning modules, and resources that apparatus 100 offers to the user.

Still referring to FIG. 1, once objective classifier 124 has been trained with user objective training data 126, it classify user metadata 114. Objective classifier 124, utilizing an algorithm, transforms the user metadata 114 into one or more user objective datums 130. As used within this disclosure, the "algorithms" refers to a set of rules or instructions followed by the system in problem-solving operations, particularly in the context of computer systems. In this context, the algorithms used by objective classifier 124 are designed to analyze user metadata 114, identify patterns or correlations, and map these patterns to specific user objective datums 130. The algorithms may involve machine learning techniques, statistical analysis, data mining, or a combination of these methods, all geared towards accurately translating the user metadata into actionable objective datums. The specific algorithms used may vary based on the nature of the user metadata and the specific objectives to be determined. User objective datums 132 serve as quantified representations of the user's aspirations or aims, derived from the unprocessed user metadata. In the context of this disclosure, the term "unprocessed" refers to data in its most original state, untouched by any form of machine learning model or algorithm. This may include data that has not been cleaned, normalized, feature-engineered, or otherwise prepared for a machine learning model. It may be raw textual data, raw visual data, or any other type of data that directly comes from the user without undergoing any computational or transformational processes. This raw metadata is then transformed by the objective classifier 124, resulting in user objective datums 130 that provide a more structured, comprehensive understanding of the user's professional objectives.

With continued reference to FIG. 1, in some embodiments, classifying user metadata 116 using the objective classifier 124 may involve machine learning algorithms, such as decision trees, neural networks, or support vector machines, to process user metadata and output user objective datums. This process may potentially also include the application of Natural Language Processing (NLP) techniques to parse and understand user inputs, especially when the user metadata includes textual or spoken information. By converting the user's raw data into clearly defined objective datums, the system is capable of devising a more personalized and effective development plan. Apparatus 100 uses primary user objective datum 132 from the user's metadata, to inform the coaching development program 138. As such, apparatus 100 may provide a tailored approach, leveraging machine learning algorithms and user-specific data to create a customized, highly relevant objective-driven coaching development program.

Still referring to FIG. 1, wherein the objective classifier 124 may include using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a processor 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, user objective datum 130 comprises both primary objectives 134 and secondary objectives 136. As used in this disclosure, an "objective" refers to a defined target or aim set by users which they aspire to achieve. Objectives may be wide-ranging, varying in nature depending on the user's particular professional aspirations, personal development goals, or specific skills users wish to improve or acquire. For example, objectives may include gaining proficiency in a certain programming language, achieving a professional certification, improving public speaking skills, or reaching a leadership position within a certain timeframe. The primary objectives 134, as part of user objective datum 130, represents the short-term goals of the user. These may be goals that the user aims to achieve within a predefined short time span, such as gaining familiarity with a new software tool within a month, or completing a specific project or assignment within a week. On the other hand, secondary objectives 136 denote the user's long-term goals. These are objectives that require a longer timeframe to achieve and might encompass career progression aims such as but not limited to, becoming a department manager within five years, or attaining a high-level certification in a specialized field within a year. The specific timeframes for immediate and secondary objectives can vary based on the user's individual requirements, personal pace, and the nature of the objectives themselves.

With continued reference to FIG. 1, apparatus 100 generates a coaching development program 138 as a function of the processed user metadata. The "coaching development program", as described in this disclosure, refers as a comprehensive, structured, and tailored plan, designed to aid the user in reaching their objectives as identified by the objective classifier 124. In an embodiment, coaching development program 138 includes at least one program objective datum 140 which aligns with the user's objectives. Program objective datum serves as an path in achieving the user's objectives. In a non-limiting example, user's objective may include enhancing leadership skills as determined from user objective datum, the program objective datum 140 might include attending a series of leadership workshops, completing a course on strategic decision making, or engaging in one-on-one mentoring with an experienced leader. Each of these activities provides targeted steps that align with the user's objective, thereby facilitating their personal development in line with their desired goals. In some embodiments, a statistical matching algorithm may be employed to align the two objective datums. This may involve creating a statistical model that predicts the alignment between user objectives and program objectives, and adjusting the program to optimize this alignment. Alternatively, machine learning models may be trained to predict this alignment, utilizing features derived from the user's metadata and objective datums. The coaching development program 138 modifies user metadata 114 by aligning the user's objectives, as identified in at least one user objective datum 130, with these program objective datums. This alignment ensures that the prescribed actions or strategies within the program are in sync with the user's aspirations, promoting goal achievements.

With continued reference to FIG. 1, coaching development program 138 includes generating a user objective prioritization matrix for the user using a predictive machine-learning model. As described in this disclosure, "user objective prioritization matrix" refers to a curated set of potential objectives tailored for a specific user, ranked or ordered based on their relevance and alignment with the user's preferences, professional background, and stated aspirations. In an embodiment, generating the coaching development program may include scoring a plurality of potential user objectives using the predictive machine-learning model. User objectives may be drawn from the user's individual competency dataset, professional experience profile, or other relevant user metadata. As a non-limiting example, user objective may score based on the relevance and alignment with the user's stated objectives, preferences, and professional background. The scoring process may involve determining a match score for each potential user objective based on a variety of factors such as the user's skills, previous professional experiences, stated interests, and short-term and long-term objectives. Once all potential user objectives are scored, they are sorted to create a user objective prioritization matrix. The sorting process may be based on the match scores, with higher scoring user objectives appearing higher on the list. Furthermore, determining a user objective datum may include selecting one or more user objectives from the user objective prioritization matrix that exceed a predetermined score threshold. This threshold may be established based on the particular needs of the user and the goals of the coaching development program 138. For example, only user objectives with a score that is higher than a certain percentile of all scores, or above a fixed numerical value, may be selected for inclusion in the user objective datum. Alternatively, the user objective datum may focus on the user objective with the maximum score, meaning the user objective that is deemed to be the most relevant or beneficial for the user based on their unique profile and objectives. In another embodiment, apparatus 100 may modify the coaching development program 138 based on the user's progress. This progress may be tracked and/or monitored using user data and may be reflected in changes in the user's skills, completion of designated tasks or milestones, feedback from the user, or any other indicators of advancement towards the user objectives. By dynamically updating the coaching development program based on user progress, apparatus 100 may ensure that the program remains relevant, effective, and aligned with the user's evolving needs and goals.

Still referring to FIG. 1, the generation of coaching development program 138 involves training program objective datum 140 with coaching training data 148. In an embodiment, coaching training data 148 may include a plurality of user-coach interaction metrics as input, correlated to a plurality of goal achievement indicators as output. User-coach interaction metrics may include data points like user engagement during coaching sessions, the frequency of coaching interactions, the user's progress in action plans, and user feedback scores.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons, and used as described above. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

With continued reference to FIG. 1, apparatus 100 generates a coaching development program 138 as a function of user profile data using a development program machine-learning model 146. In some embodiment, development program machine-learning model 146 may be trained to interpret and predict the most efficient and effective path towards the user's goals, based on the user profile data. The user profile data may include but is not limited to the user's skills, preferences, objectives, and historical interactions. In one embodiment, the development program machine-learning model 146 further includes a deep learning model. "Deep learning models", for the purposes of this disclosure, refers to a subset of machine learning models that mimic the neural networks of the human brain to interpret patterns and relationships within the data. These models provide an additional layer of complexity and accuracy, enabling the system to learn and adapt with each interaction, thus improving its efficiency over time. Development program machine-learning model 146 is employed to generate a personal goal prioritization matrix for the user. This list consists of suggested goals and objectives that align with the user's skills and professional background, thereby enhancing the user's chances of success.

With continued reference to FIG. 1, generating a coaching development program as a function of the processed user metadata, wherein the coaching development program is configured to provide a user access to a plurality of resources using a coaching enhancement module 142. As used in this disclosure, the "resources" refers to any materials, tools, or otherwise sessions accessible to a user to assist in or enhance the user's coaching experience. As used in this disclosure, the "coaching experience" to cumulative set of interactions, teachings, feedbacks, and/or learning events that occur between a user e.g., a coach and first entity as described in detail below e.g., client. For example, company may facilitate a workshop where training the coach to learn about new strategies or tools to handle specific challenges in their professional or personal life. Another example may be having regular check-ins where apparatus evaluates the coaches' progress on predefined tasks or objectives. In a non-limiting example, these resources may include training modules or seminars on business development strategies, empowering the user to actively pursue and secure new clientele. Resources may also include access to proprietary company source resources, such as lead databases, industry contacts, and market insights, which provide the user with a competitive advantage when seeking potential clients. Resources may also include interactive tutorials and demonstrations on the effective utilization of company source tools, ensuring that coaches are adept at leveraging these tools to enhance their client interactions and overall business operations. As used in this disclosure, a "coaching enhancement module" refers to an integrated software that may facilitate the use of resources by the user. This module may encompass industry-specific software and infrastructure designed to streamline business development activities, enable user outreach for client acquisition using company assets, and provide seamless access and training on the company's proprietary tools and methodologies. In a non-limiting example, coaching enhancement module 142 may function upon user (in this case, a coach) login, the module presents a dashboard that visually represents various company assets available for use. For example, but not limited to, client acquisition tools, business development workshops, company asset repository, feedback and continuous learning, collaborative tools, alerts and notifications, and the like. In an embodiment, wherein the plurality of resources comprises at least a training session. As used in this disclosure, a "training session" refers to an interactive instructional period during which a user may be equipped with knowledge, skills, and best practices related to user acquisition, business development, and the optimal utilization of company assets. As a non-limiting example, training session may be facilitated by experienced professionals or senior coaches within the company, training session may be delivered through various formats including live webinars, on-site workshops, on-demand video modules, or interactive virtual simulations. The content of training session is dynamic and may be updated based on evolving business strategies, market trends, and feedback from participants. Additionally, these sessions may also encourage peer-to-peer learning and offer opportunities for users to collaborate, share experiences, and discuss challenges, thus fostering a community of continuous learning and improvement. In another embodiment, wherein the plurality of resources comprises a first entity acquisition enhancement resources. These acquisition enhancement resources may be tools, platforms, training materials, or communication channels tailored specifically to streamline and optimize the process of onboarding or partnering with the first entity.

In an embodiment, still referring to FIG. 1, wherein the plurality of resources comprises at least a training session. As used in this disclosure, a "training session" refers to an interactive instructional period during which a user may be equipped with knowledge, skills, and best practices related to user acquisition, business development, and the optimal utilization of company assets. As a non-limiting example, training session may be facilitated by experienced professionals or senior coaches within the company, training session may be delivered through various formats including live webinars, on-site workshops, on-demand video modules, or interactive virtual simulations. The content of training session is dynamic and may be updated based on evolving business strategies, market trends, and feedback from participants. Additionally, these sessions may also encourage peer-to-peer learning and offer opportunities for users to collaborate, share experiences, and discuss challenges, thus fostering a community of continuous learning and improvement. In a further embodiment, wherein providing the user access to the plurality of resources comprises triggering an alert mechanism upon pre-defined set of criteria met during the entry protocol. An "alert mechanism", as used in this disclosure refers to a systematized notification process designed to inform relevant stakeholders when certain conditions or thresholds are met or exceeded. The "entry protocol", as used in this disclosure refers to a systematic and predefined set of steps, actions, events, or otherwise criteria user must adhere to, complete, or fulfill in order to gain access to plurality of resources as described herein. Entry protocol may include, but not limited to user authentication, user profiling, user progress check, resource availability verification, and the like. Pre-defined set of criteria may include, but not limited to user's personal and professional profiles, providing details such as background, experience, goals, and the like. The primary function of this mechanism is to facilitate timely and appropriate responses to changes or achievements within the system. It may operate across various platforms and mediums such as emails, SMS notifications, dashboard updates, or even automated phone calls. The specifics of the alert may vary, from simple notifications that a criterion has been met to more complex alerts containing detailed information and potential recommended actions. For instance, as a non-limiting example, once a user has completed a training session from the plurality of resources, alert mechanism may notify the user's direct supervisor or mentor about the accomplishment, enabling timely recognition or further actions. In another scenario, if the user struggles with particular resources or fails to meet certain criteria repeatedly, the alert mechanism can notify support teams to provide additional assistance or training to the user.

Still referring to FIG. 1, apparatus 100 is also configured to track and adjust the user's progress on primary and secondary objectives by utilizing secondary user input data. This secondary user input data may encompass user feedback, a set of performance indicators, engagement analytics, or any additional data source that may yield valuable insight into the user's progression towards their objectives. For example, user feedback may take the form of self-reported ratings on progress, testimonials on the effectiveness of the resources, or qualitative reflections on the learning experience. Performance metrics may involve measures of goal-related tasks or activities, while engagement data may reveal the user's usage patterns and level of interaction with the resources. In addition to monitoring progress, apparatus 100 is engineered to generate and adapt the trajectory within the user's personalized development program by using machine learning techniques to analyze the gathered data and recalibrate the program objectives and strategies as needed. This ensures that the development program remains relevant and effective, adapting to changes in the user's goals, performance, preferences, or circumstances.

In an embodiment, still referring to FIG. 1, apparatus 100 may include a process for matching the first entity goals with the users goals. As used in this disclosure, "first entity" refers to an individual or company that is working with the principal coaching company as a third party. This may include clients, vendors, or any other entity that has a business relationship with the principal coaching company. In particular, program objective datum may be received from the first entity, which in this case may be the client. This information is then processed by apparatus 100 to align the client's objective with the coach's objective. This process may ensure the coaching development program is tailored to the specific needs and goals of the client and that the coach's objectives are aligned with the client's objectives. This alignment is crucial to the success of the coaching program, as it enables the coach to create a personalized and targeted development plan that is designed to help the client achieve their goals. Apparatus 100 may utilize various methods to match the client's goals with the coach's goals, such as identifying common themes or areas of overlap between the two objectives, and adjusting the program to optimize the alignment. For instance, in some embodiments, a statistical matching algorithm may be employed to align the two objective datums, using a similarity metric based on these two datums, and minimizing the similarity metric below a certain metric threshold. Alternatively, machine learning models may be trained to predict this alignment, utilizing features derived from the user's metadata and objective datums. In certain implementations, a rule-based system may be used. Here, a set of pre-determined rules or heuristics define how the user objectives align with the program objectives. These rules may be manually defined by experts, derived from past data, or a combination of both. The rules are then applied to guide the generation of the personal development program, ensuring the prescribed actions or strategies within the program are in sync with the user's aspirations, thereby promoting goal achievement.

With continued reference to FIG. 1, initiating a digital communication 144 based on the coaching development program between the user and a first entity, wherein the digital communication 144 comprises at least a linkage between the first entity and a second entity. In this embodiment, the initiation of digital communication 144 may facilitate collaboration and exchange of information but also includes the introduction of the user to various funding partners at the outset of the coaching development program. As used in this disclosure, a "digital communication" is a variety of communication forms like email, messaging, video conferencing, and the like, may be aimed at fostering collaboration and facilitating information exchange. The "linkage" between the first entity and the second entity is crucial from the inception of the coaching process 122, may serve as a foundational component for the user's development journey. The linkage allows for shared access to resources, joint training participation, and other collaborative forms that bolster the user's development. As used in this disclosure, a "second entity" is defined as any collaborator with the principal coaching company, engaged in potential synergistic endeavors and resource contributions, including but not limited to investors, affiliates, consultants, and strategic allies. As a non-limiting example, the linkage may be a shared digital workspace or platform where the first entity, perhaps a senior or mentor, collaborates with the second entity, potentially a new partner or a funder, on a joint project or objective. This workspace may include tools for document sharing, real-time editing, task assignment, and progress tracking, which can be synchronized and accessed by both parties. Such linkages not only streamline the coaching process 122 but also ensure that all stakeholders are aligned in terms of goals, strategies, and expectations. Within this digital communication framework, the user might initiate a video conferencing session with the first entity to discuss the progress of their coaching development program. During this discussion, they might share screen visualizations of their current progress, ask for feedback, or jointly troubleshoot any challenges. The second entity could be brought into the conversation to provide additional perspectives or resources, thereby enriching the discussion, and ensuring comprehensive support for the user. The digital platform might also include notification or alert systems, ensuring timely responses and encouraging consistent engagement among all parties involved. In an embodiment, the process of selecting and introducing various funding partners may occur at the beginning of this process, to provide the user with a comprehensive view of financial options and strategic partnerships. Early introduction to funding partners may allow the user to consider financial strategies and resources from the start, aligning financial planning with personal development goals. The digital communication infrastructure may support the process by enabling early engagement with potential funders through the shared digital workspace, where resources, feedback, and strategic discussions take place among all relevant stakeholders, establishing a foundation for the user's growth and the success of the coaching program.

Further referring to FIG. 1, apparatus 100 may be designed to present the coaching development program through a visual interface on a display device. As used in this disclosure, a "display device" may be any device capable of rendering visual content, such as a computer monitor, a mobile device screen, or a projection device. Moreover, the display of coaching development program encapsulates a comprehensive set of data, contributing to a well-rounded user experience. This includes showcasing a top-matching coaching profile, which provides the user with detailed information about the coach best matched to their objectives and preferences. For example, the coach profile may include the coach's expertise, qualifications, coaching style, and user reviews, aiding the user in understanding why this coach has been recommended and enabling an informed decision. Furthermore, the interface displays comprehensive expertise metadata. This metadata provides an in-depth overview of the skills, knowledge, and experiences that the user may expect to gain from engaging with the resources in their development program. It may include, for example, the learning objectives of a course, the qualifications a training program prepares the user for, or the specific skills a reading material can help user develop. Lastly, the interface may include a previous feedback analysis. This feature provides a review of past feedback, tracking the user's progress over time and highlighting areas of improvement or achievement. This retrospective view offers valuable insights and motivation for the user, and it also assists in informing future modifications to the program.

Figure 2:
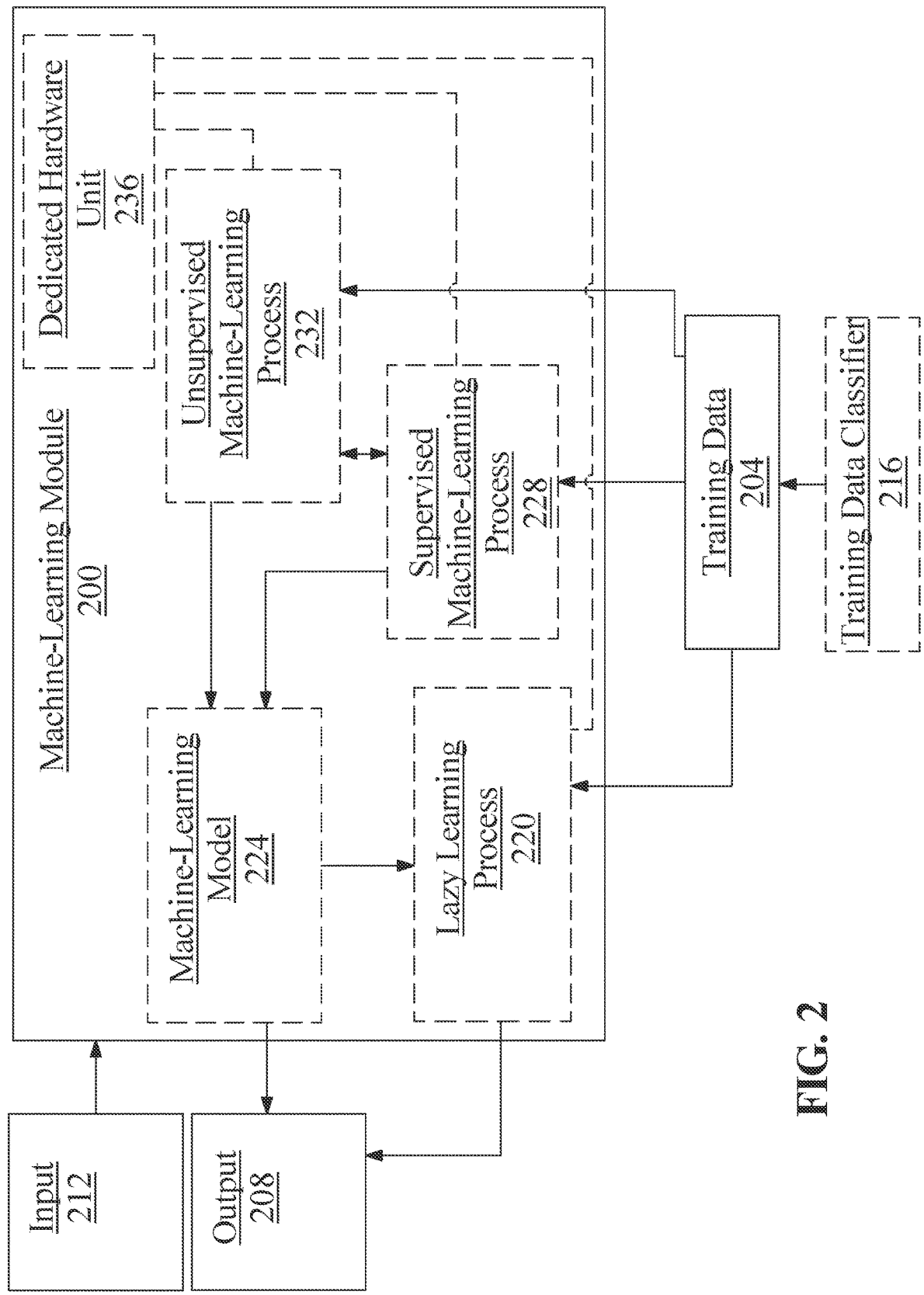
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, inputs may include user metadata like personal skills, professional background, primary objectives, secondary objective, and interaction with the chat bot 110. Apparatus 100 may consider secondary user input data such as user feedback, performance metrics, and engagement data. The corresponding outputs in this context may involve classified user objective datum 130, including primary user objective datum 132. These output elements serve as objective representation of the user's goals, extracted from the raw user metadata. Another output may be the coaching development program 138. Coaching development program 138 is constructed as a function of processed user metadata. The program may further include program objective datum 140 to align user's goal with suitable resources.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to classify user metadata based on factors such as the user's professional background, personal skills, primary objectives, and secondary objectives.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
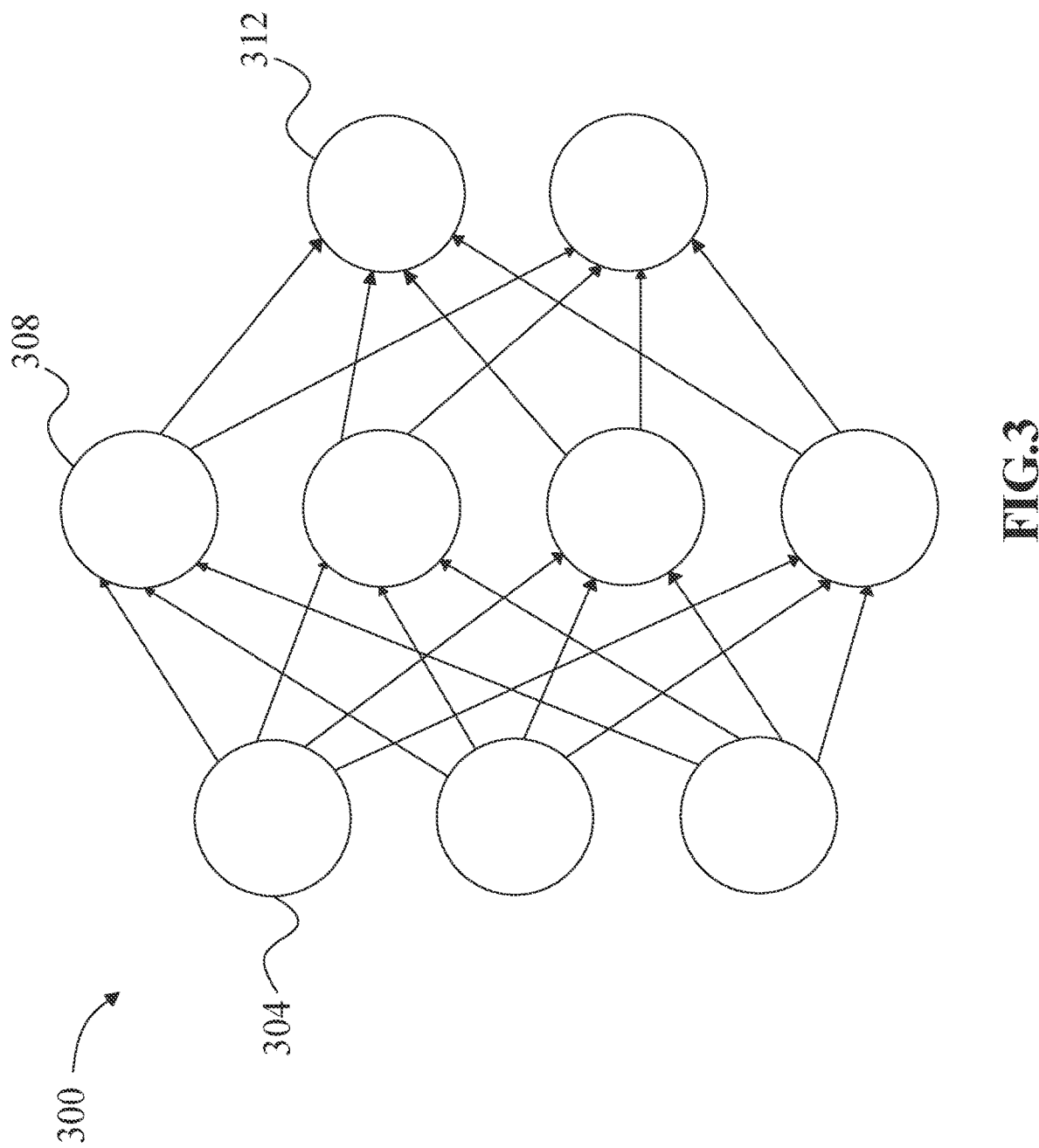
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
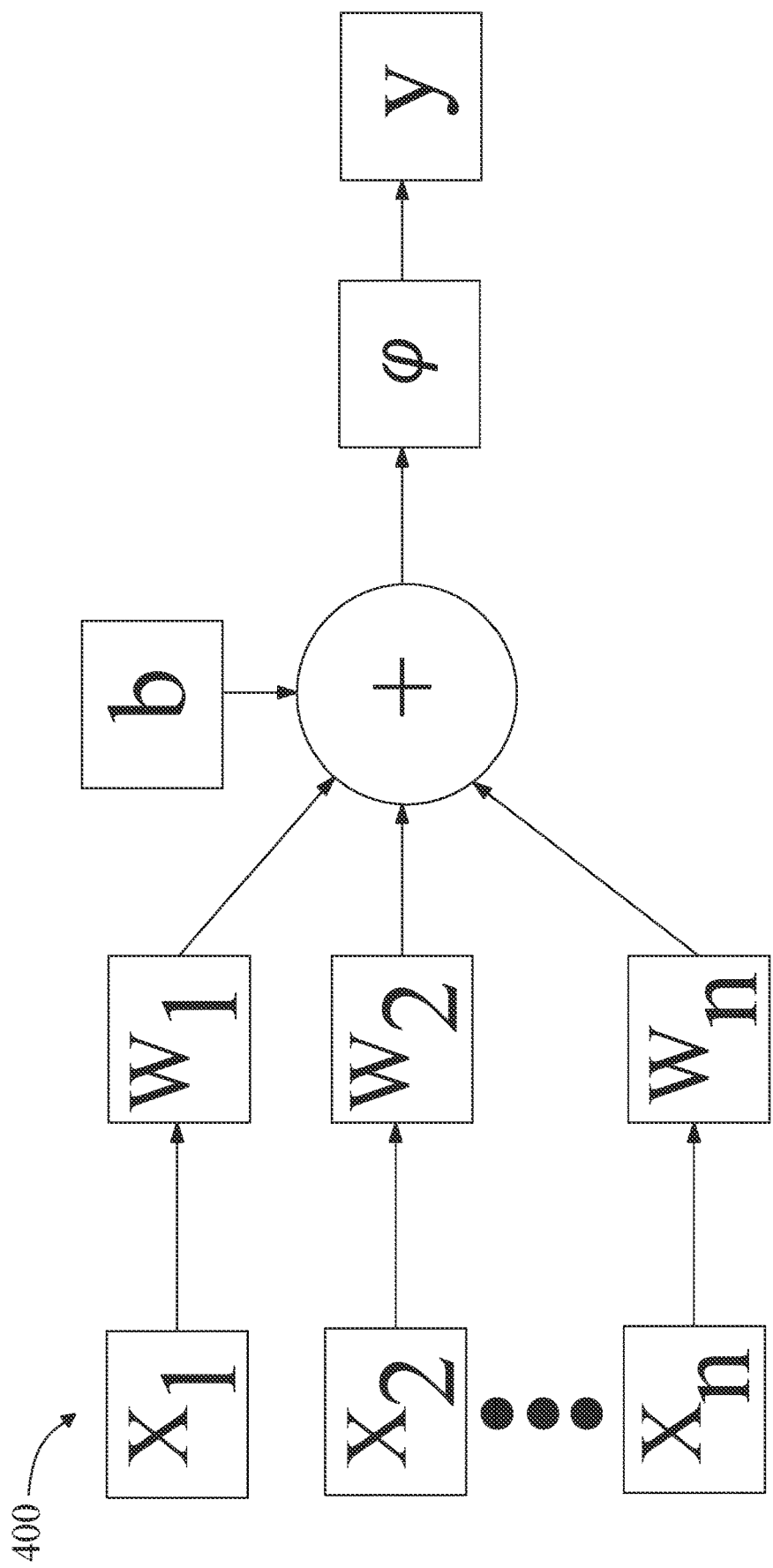
FIG. 4 is a diagram of an exemplary embodiment of a node of a neural network.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
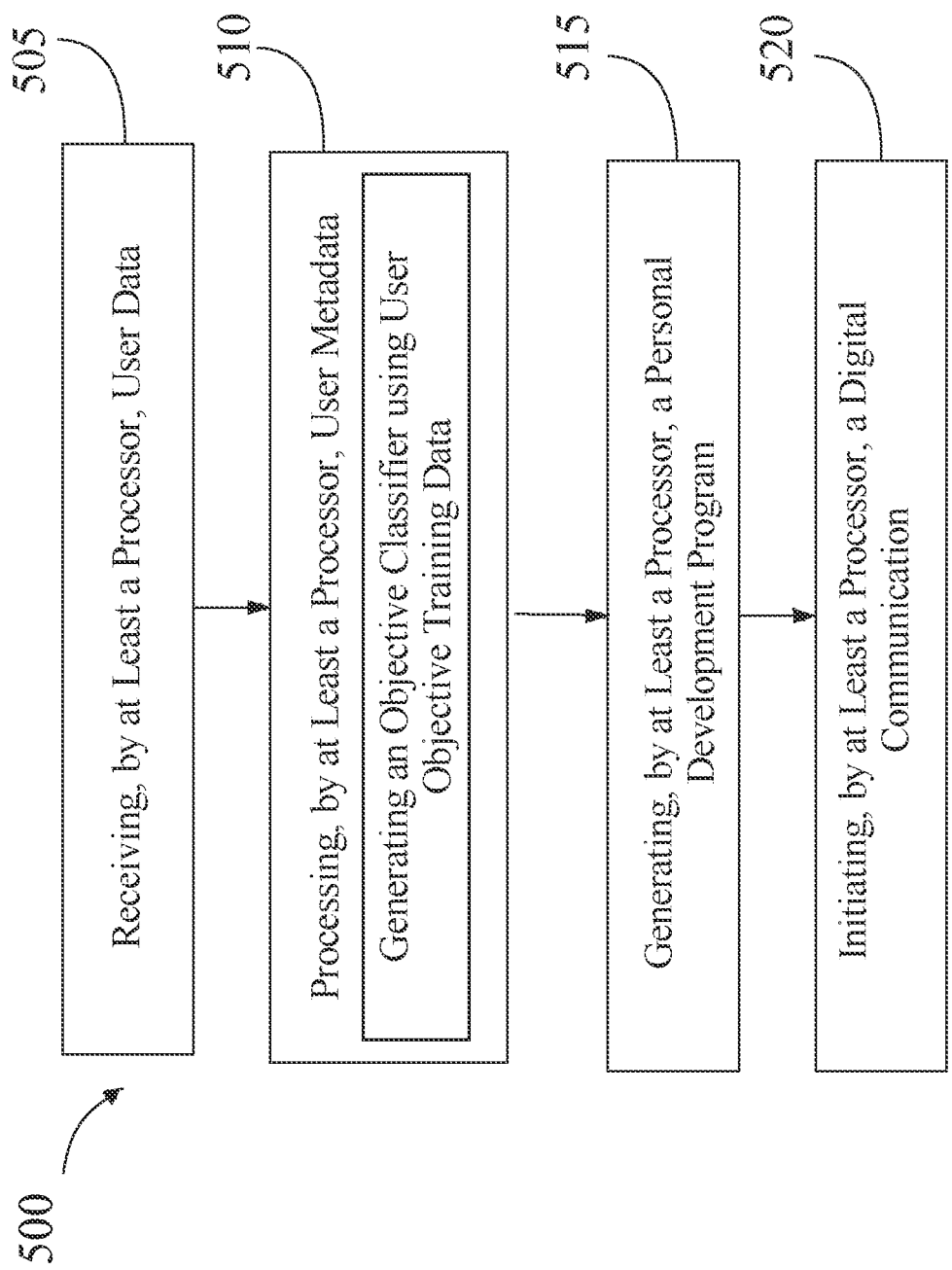
FIG. 5 is a flow diagram illustrating an exemplary workflow of a method for generating a coaching development program.

Referring now to FIG. 5, a flow diagram of an exemplary method 500 for generating a personal achievement within a coaching process is illustrated. Method 500 includes a step 505 of receiving, by at least a processor, user data pertaining to the user, wherein user data comprises user metadata. This may be implemented, without limitation, as described above with reference to FIGS. 1-4.

With continued reference to FIG. 5, method 500 includes a step 510 of processing, by at least a processor, a user metadata of the user input. This may be implemented, without limitation, as described above with reference to FIGS. 1-4.

In some embodiments, and still referring to FIG. 5, processing the user metadata comprises generating an objective classifier using user objective training data comprises a plurality of user metadata as input correlate to a plurality of user objective datum as output. This may be implemented, without limitation, as described above with reference to FIGS. 1-4.

In some embodiments, and still referring to FIG. 5, processing the user metadata comprises classifying the user metadata into at least one user objective datum using the trained objective classifier wherein the at least one user objective datum comprises at least one primary user objective datum. This may be implemented, without limitation, as described above with reference to FIGS. 1-4.

With continued reference to FIG. 5, method 500 includes a step 515 of generating, by at least a processor, a coaching development program as a function of the processed user metadata. In some embodiments, generating the coaching development program may include at least one program objective datum and is configured to modify the user metadata by aligning the at least one user objective datum with the at least one program objective datum. This may be implemented, without limitation, as described above with reference to FIGS. 1-4.

With continued reference to FIG. 5, method 500 includes a step 520 of displaying, by at least a processor, the coaching development program using a visual interface at a display device. This may be implemented, without limitation, as described above with reference to FIGS. 1-4.

Figure 6:
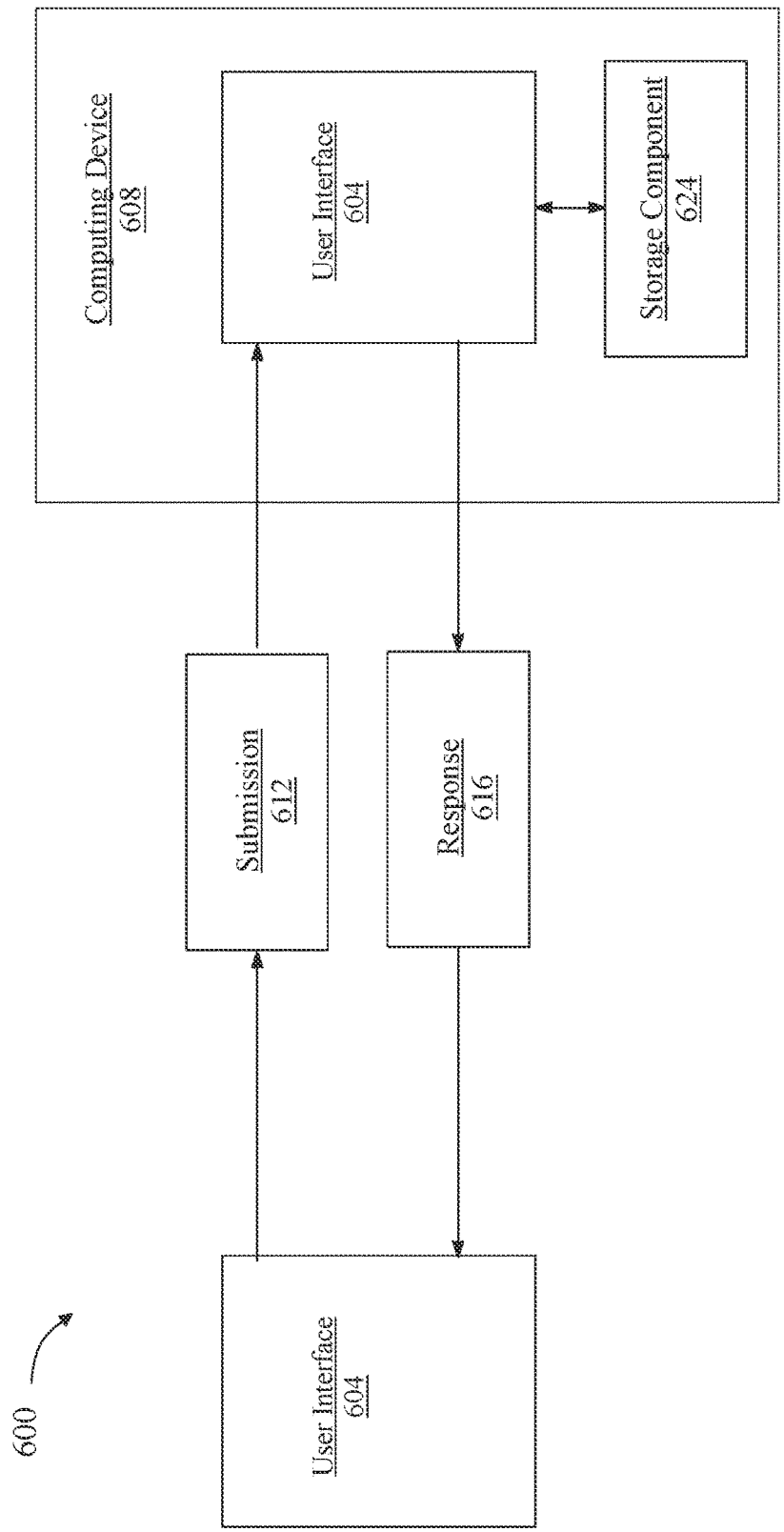
FIG. 6 is an illustration of an exemplary embodiment of a chatbot.

Referring to FIG. 6, a chatbot system 600 is schematically illustrated. According to some embodiments, a user interface 604 may be communicative with a computing device 608 that is configured to operate a chatbot. In some cases, user interface 604 may be local to computing device 608. Alternatively or additionally, in some cases, user interface 604 may remote to computing device 608 and communicative with the computing device 608, by way of one or more networks, such as without limitation the internet. Alternatively or additionally, user interface 604 may communicate with user device 608 using telephonic devices and networks, such as without limitation fax machines, short message service (SMS), or multimedia message service (MMS). Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 608 to the chatbot, and a response 616, from the chatbot to the user interface 604. In many cases, one or both of submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor 620. In some embodiments, processor 620 processes a submission 612 using one or more of keyword recognition, pattern matching, and natural language processing. In some embodiments, processor employs real-time learning with evolutionary algorithms. In some cases, processor 620 may retrieve a pre-prepared response from at least a storage component 624, based upon submission 612. Alternatively or additionally, in some embodiments, processor 620 communicates a response 616 without first receiving a submission 612, thereby initiating conversation. In some cases, processor 620 communicates an inquiry to user interface 604; and the processor is configured to process an answer to the inquiry in a following submission 612 from the user interface 604. In some cases, an answer to an inquiry present within a submission 612 from a user device 604 may be used by computing device 104 as an input to another function, for example without limitation at least a feature 108 or at least a preference input 112.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
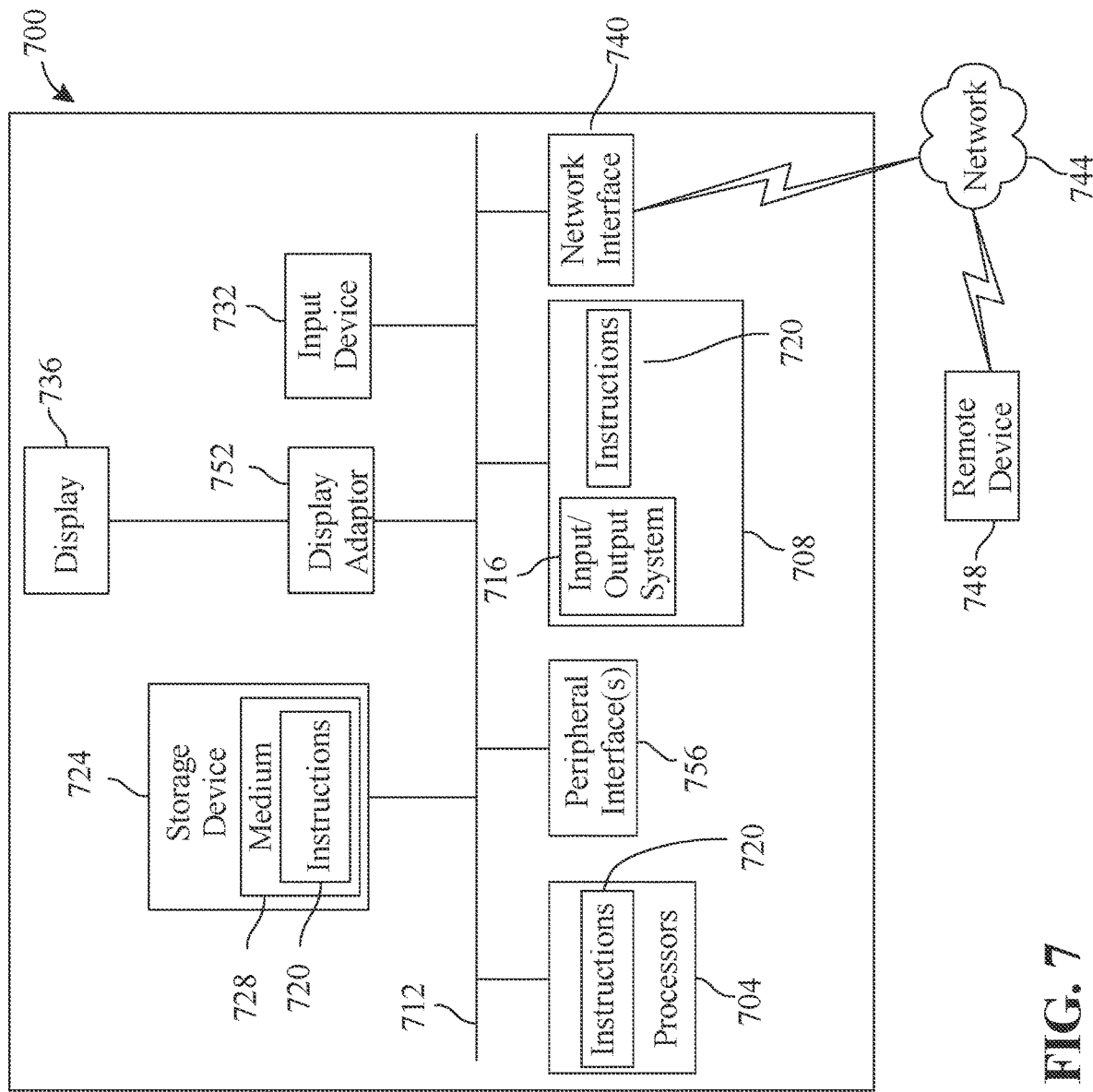
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 74, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 74, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a coaching development program within a coaching process, the apparatus comprises:
    at least a processor; and
    a memory communicatively connected to the at least a processor, wherein the memory contains instructions configuring the at least a processor to:
        receive user data pertaining to a user, wherein the user data comprises user metadata;
        process the user metadata, wherein processing the user metadata comprises:
            generating an objective classifier using user objective training data, wherein the user objective training data comprises a plurality of user metadata as input correlate to a plurality of user objective datums as output; and
            classifying the user metadata into at least one user objective datum using the trained objective classifier, wherein the at least one user objective datum comprises at least one primary user objective datum;
        generate a coaching development program as a function of the processed user metadata, wherein:

the coaching development program comprises at least one program objective datum; and
the coaching development program is configured to provide a user access to a plurality of resources using a coaching enhancement module, wherein the plurality of resources comprises at least a training session; and
initiate a digital communication based on the coaching development program between the user and a first entity, wherein the digital communication comprises at least a linkage between the first entity and a second entity.

2. The apparatus of claim 1, wherein the user metadata comprises an individual competency dataset and a professional experience profile.

3. The apparatus of claim 1, wherein the at least one user objective datum comprises at least one primary objective datums and secondary objective datum.

4. The apparatus of claim 1, wherein receiving the user data comprises an automated data collection process.

5. The apparatus of claim 4, wherein the automated data collection process comprises:
a utilization of a data collection unit configured to receive the user data, wherein the data collection unit comprises a chatbot.

6. The apparatus of claim 1, wherein generating the coaching development program comprises:
training a development program machine-learning model using coaching training data, wherein the coaching training data comprises a plurality of user-first entity interaction metrics as input correlated to a plurality of goal achievement indicators as output; and
generating the coaching development program as a function of coaching training data using the trained development program machine-learning model.

7. The apparatus of claim 1, wherein generating the coaching development program comprises:
generating a user objective prioritization matrix for the user using a predictive machine-learning model, wherein the predictive machine-learning model is trained using coaching training data comprising a plurality of user objective datums as input correlated to a plurality of coaching development programs as output;
determining a user objective datum as a function of the user objective prioritization matrix and the processed user metadata; and
monitoring a user progress on the at least a primary user objective datum based on the user data.

8. The apparatus of claim 1, wherein providing the user access to the plurality of resources comprises:
initiating an entry protocol for the user based on the user data, wherein the entry protocol comprises a pre-defined set of criteria; and
triggering an alert mechanism upon a pre-defined set of criteria met during the entry protocol.

9. The apparatus of claim 1, wherein the plurality of resources comprises a first entity acquisition enhancement resource.

10. The apparatus of claim 7, wherein the memory further comprises instructions configuring the at least a processor to modify the coaching development program based on the user progress.

11. A method for generating a personal achievement within a coaching process, the method comprises:
receiving, by the at least a processor, user data pertaining to a user, wherein the user data comprises user metadata;
processing, by the at least a processor, a user metadata, wherein processing the user metadata comprises:
generating an objective classifier using user objective training data, wherein the user objective training data comprises a plurality of user metadata as input correlate to a plurality of user objective datums as output; and
classifying the user metadata into at least one user objective datum using the trained objective classifier, wherein the at least one user objective datum comprises at least one primary user objective datum;
generating, by the at least a processor, a coaching development program as a function of the processed user metadata, wherein:
the coaching development program comprises at least one program objective datum; and
the coaching development program is configured to provide a user access to a plurality of resources using a coaching enhancement module, wherein the plurality of resources comprises at least a training session; and
initiating, by the at least a processor, a digital communication based on the coaching development program between the user and a first entity, wherein the digital communication comprises at least a linkage between the first entity and a second entity.

12. The method of claim 11, wherein the user metadata comprises an individual competency dataset and a professional experience profile.

13. The method of claim 11, wherein the at least one user objective datum comprises at least one primary objective datums and secondary objective datum.

14. The method of claim 11, wherein receiving the user data comprises an automated data collection process.

15. The method of claim 14, wherein the automated data collection process comprises:
a utilization of a data collection unit configured to receive the user data, wherein the data collection unit comprises a chatbot.

16. The method of claim 11, wherein generating the coaching development program comprises:
training a development program machine-learning model using coaching training data, wherein the coaching training data comprises a plurality of user-first entity interaction metrics as input correlated to a plurality of goal achievement indicators as output; and
generating the coaching development program as a function of coaching training data using the trained development program machine-learning model.

17. The method of claim 11, wherein generating the coaching development program comprises:
generating a user objective prioritization matrix for the user using a predictive machine-learning model, wherein the predictive machine-learning model is trained using coaching training data comprising plurality of user objective datums as input correlated to a plurality of coaching development programs as output;
determining a user objective datum as a function of the user objective prioritization matrix and the processed user metadata; and
monitoring a user progress on the at least a primary user objective datum based on the user data.

18. The method of claim 11, wherein providing the user access to the plurality of resources comprises:
initiating an entry protocol for the user based on the user data, wherein the entry protocol comprises a pre-defined set of criteria; and triggering an alert mechanism upon a pre-defined set of criteria met during the entry protocol.

19. The method of claim 11, wherein the introduced a plurality of resources comprises a first entity acquisition enhancement resources.

20. The method of claim 17, further comprising:
modifying, by the at least a processor, the coaching development program based on the user progress.

\* \* \* \* \*